July 2, 1929.　　　　F. W. SCHNEIBLE　　　　1,718,983
LOCK JOINT METAL TUBING
Filed Dec. 6, 1926
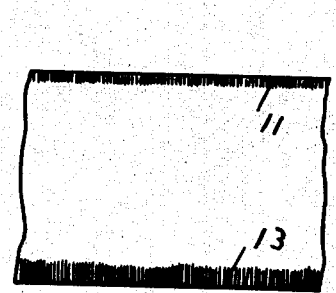
Fig. 1.
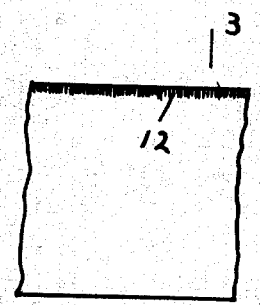
Fig. 2.
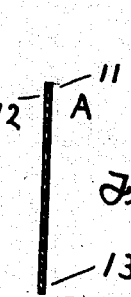
Fig. 3.
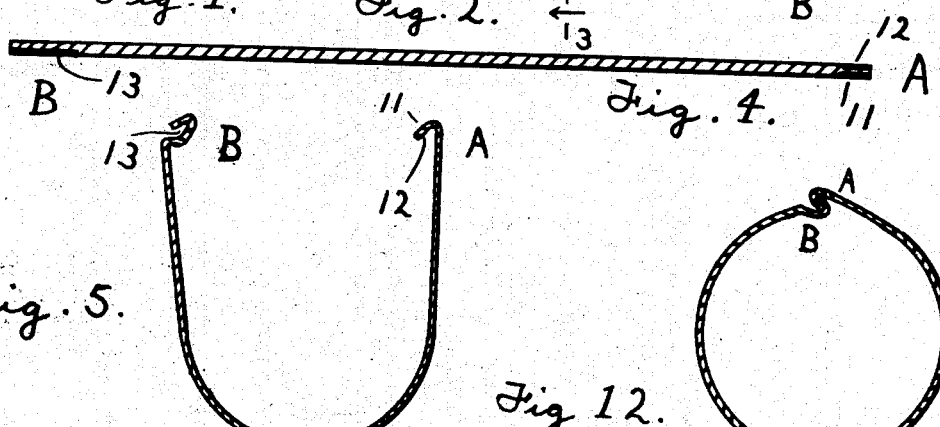
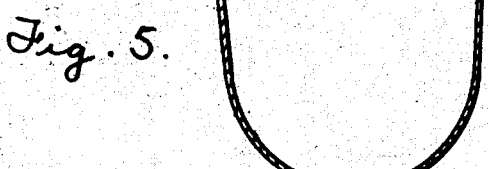
Fig. 5.
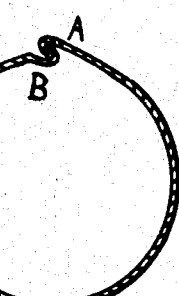
Fig. 6.
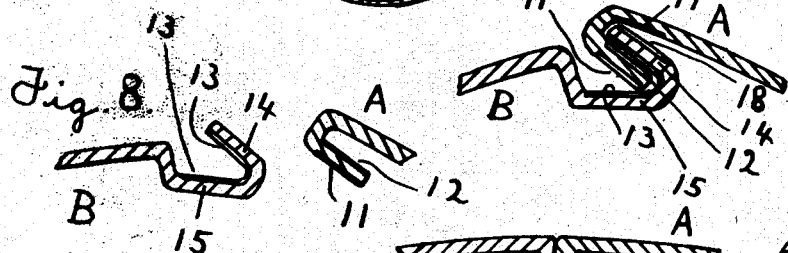
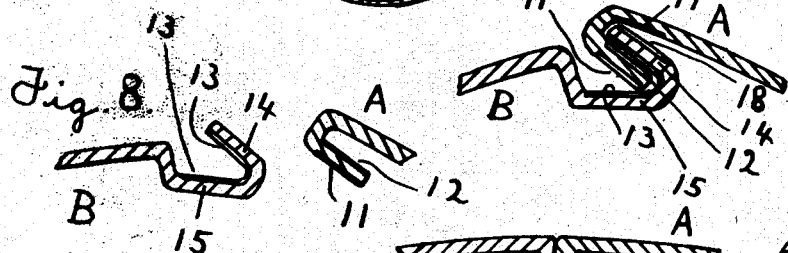
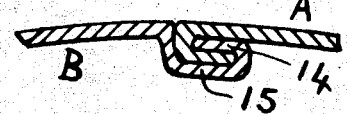
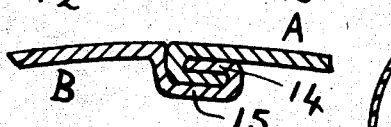
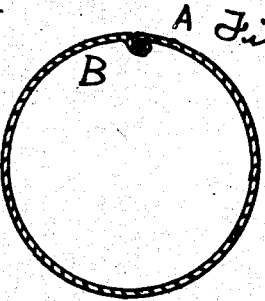
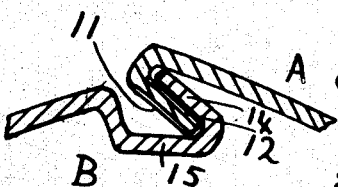
Inventor
Frank W. Schneible
By Martin & Rendell
Attorneys Patented July 2, 1929.

1,718,983

UNITED STATES PATENT OFFICE.

FRANK W. SCHNEIBLE, OF ROME, NEW YORK, ASSIGNOR TO ROME MANUFACTURING COMPANY, OF ROME, NEW YORK, A CORPORATION.

LOCK-JOINT METAL TUBING.

Application filed December 6, 1926. Serial No. 152,888.

My present invention relates to lock joint metal tubing.

The subject-matter of this application was originally a part of an application filed by me August 10, 1925, as Serial Number 49,389.

In lock-joint metal tubing the opposite edges of a strip of sheet metal are formed into hooks, the strip of metal is bent into a more or less circular form and these hooks brought into engagement with each other and then closed down upon each other to complete the tubing. While this lock-joint does not pull apart the joint is not and especially under strain or after fabrication does not remain rigid; for instance when a length of it is subjected to a twisting strain the tube will twist through the interengaging hooks sliding slightly on each other; and this sliding is especially noticeable after the tubing has been subjected to a bending or other fabricating operation as when a length of it has been bent to form a head or foot frame of a bedstead. This slipping of the joint results in the tubing or the article made therefrom not having the rigidity which should be present in a really solid piece of tubing. The purpose of my invention is to overcome the above fault in lock-joint tubing and to provide lock-joint tubing which is rigid both in the original tubing and which stays rigid or non-slipping in its joint even after the tubing has been subjected to a bending or other fabricating operation or operations. I accomplish this by knurling or otherwise roughening the faces or certain of the faces adjacent the opposite edges of the strip of metal that are to interengage in the lock-joint.

Further purposes and advantages of my invention will appear from the specifications and claims herein.

Figs. 1 and 2 are plan views respectively of the outside face and of the inside face of a short length of a strip of sheet metal as knurled preparatory to being formed into lock-joint tubing pursuant to my invention.

Fig. 3 is a sectional view on line 3—3 of Fig. 2.

Fig. 4 is a sectional view similar to Fig. 3 but on an enlarged scale.

Fig. 5 is a similar sectional view through the strip after it has had the hooks formed in its edges and has been rolled to be U-shaped in cross section.

Fig. 6 is a similar sectional view after the hooked edges have been brought into engagement but before the hooks have been closed upon each other.

Fig. 7 is a similar sectional view through the completed tubing.

Figs. 8, 9 and 10 are detailed sectional views on a greatly enlarged scale through the hooked edges as they appear in Figs. 5, 6 and 7 respectively.

Figs. 11, 12 and 13 are detailed sectional views on a greatly enlarged scale through the hooked edges of tubing embodying various modifications of my invention.

In the drawings I have shown a lock-joint metal tubing embodying several forms of my invention but it will be understood that such drawings are illustrative of my invention and that as indicated in the claims herein my invention may be applied in the manner varying somewhat from the specific form shown in the drawings and described in detail in the specification.

Referring to the drawings in a more particular description it will be seen that the strip of sheet metal from which the tubing is to be formed has one or both of its surfaces roughened or knurled for a short distance in from its extreme edge at the two edges A and B of the strip. In the preferred form of my invention the edge A of the strip of metal has a relatively narrow band 11 on its outside face and a similar relatively narrow band 12 on its inside face knurled or otherwise roughened, while at the edge B of the metal only the outside or outer face of the metal is knurled as at the relatively wider band 13. Under this arrangement the edge A of the strip of metal is subsequently formed into what I will call for definiteness the inner hook and the edge B of the strip of metal will be formed into what I will call for definiteness the outer hook. An inspection of the drawings will then show that the inner hook has on its opposite faces the knurled bands 11 and 12 and that the relatively wider knurled band 13 formed on the edge B when said edge B has been formed into the outer hook has its knurled band 13 disposed partly upon the inwardly facing side of the portion 14 of this outer hook and partly upon the outwardly facing side of the portion 15 of this hook.

As the strip of metal is progressed through the machine the hooks will be brought into the position shown in Figs. 7 and 10. An inspection of the larger views Figs. 9 and 10 will show that the portion of the knurled band 13 on the part 14 of the outer hook will be opposite the knurled band 12 on the inner hook and that the portion of the knurled band 13 on the outwardly facing surface of the part 15 will be opposite the knurled band 11 on the inner hook. As the parts are pressed from the relative position in Fig. 9 into the permanent position shown in Fig. 10, it would be obvious that these two pairs of oppositely disposed knurled faces will be brought into intimate or very tight contact. The effect of the knurling or roughening of these knurled bands of metal is to produce small ridges of metal extending up from the general face of the material usually upon both sides of the slight depressions formed by the knurling rolls or other mechanism used to roughen or knurl the metal. These minute outstanding ridges especially in conjunction with the depressions will, when the lock-joint is pressed tightly together, form a lock-joint which will not slip when a length of tubing is subjected to a twisting action and so will neutralize or greatly reduce any tendency of the tubing to twist for the reason that edges in the lock-joint can not now slip on each other; for the same reason the knurled surfaces will hold the two parts of the lock-joint permanently in position even though the tubing be subjected to bending or other fabricating operations.

In Figs. 1 to 10 I have shown my invention as utilizing two pairs of oppositely disposed knurled faces interengaging within the lock-joint. This construction I believe to be the preferred embodiment of my invention. In Fig. 11 I have shown a construction wherein only one pair or interengaging knurled surfaces are used, namely, at the band 11 on the inner hook and at the band 16 on the outer hook upon the outwardly facing surface of the portion 15 of this hook.

It will be obvious that any other interengaging pair of surfaces might be knurled. It will also be obvious that the knurling or roughening may be upon three pairs of inter-engaging surfaces as shown in Fig. 12. This example of my construction varies from that shown in Figs. 1 to 10 in that there is a band of knurling at 17 upon the main body of the tube material adjacent the inner hook and a co-operating band as at 18 upon the outwardly facing surface of the portion 14 of the inner hook. It is believed, however, that the addition of this last pair of knurled surfaces is not necessary in order to effect a good non-slipping joint.

In Fig. 13 I have shown a construction where all the knurling is upon one part or edge of the tubing, say on edge A but it might be all upon the other part. This construction is within the broad scope of my invention and is a modification that is available for certain uses of tubing.

In all the forms of tubing embodying my invention it will be understood that the knurling is slight or shallow and does not extend into the sheet metal sufficiently to form serrations, knurling or unevenness on the other side of the material. It will be noted especially that the knurling is never placed on a surface that will be exposed when the tubing is completed. Consequently in the completed tube both the exposed surfaces, viz; the inside and the outside surfaces of the tubing at the joint will be smooth or free from serrations or knurling so that the utility or appearance of the tubing will not be interfered with for any purpose.

What I claim as new and desire to secure by Letters Patent is:

1. Lock-joint metal tubing comprising a main tubular member having its edges provided with reversely disposed, turned-back hooked portions, inter-engaging each other and pressed together and to the co-operating portions at each edge opposite the hook portions, said hooked portions and the portions of the tubing opposite said hooked portions each extending in an uninterrupted plane longitudinally of the seam with the inter-engaging pairs of surfaces of said hooked portions within the joint minutely knurled with serrations extending transversely of the joint whereby longitudinal slippage of said edges relative to each other is prevented.

2. Lock-joint metal tubing comprising a main tubular member having its edges provided with reversely disposed, turned-back hooked portions, inter-engaging each other and pressed together and to the co-operating portions at each edge opposite the hook portions, said hooked portions and the portions of the tubing opposite said hooked portions each extending in an uninterrupted plane longitudinally of the seam with certain of the inter-engaging pairs of surfaces of said hooked portions within the joint minutely knurled with serrations extending transversely of the joint whereby longitudinal slippage of said edges relative to each other is prevented.

3. Lock-joint metal tubing comprising a main tubular member having its edges provided with reversely disposed, turned-back hooked portions, inter-engaging each other and pressed together and to the co-operating portions at each edge opposite the hook portions, said hooked portions and the portions of the tubing opposite said hooked portions each extending in an uninterrupted plane longitudinally of the seam with the inter-engaging pairs of surfaces of said hooked portions and co-operating opposite portions within the joint minutely knurled with serrations extending transversely of the joint whereby longitudinal slippage of said edges relative to each other is prevented.

4. Lock-joint metal tubing comprising a main tubular member having its edges provided with reversely disposed, turned-back hooked portions, inter-engaging each other and pressed together and to the co-operating portions at each edge opposite the hook portions, said hooked portions and the portions of the tubing opposite said hooked portions each extending in an uninterrupted plane longitudinally of the seam with certain of the inter-engaging pairs of surfaces of said hooked portions and co-operating opposite portions within the joint minutely knurled with serrations extending transversely of the joint whereby longitudinal slippage of said edges relative to each other is prevented.

5. Lock-joint metal tubing comprising a main tubular member having its edges provided with reversely disposed, turned-back hooked portions, inter-engaging each other and pressed together and to the co-operating portions at each edge opposite the hook portions, said hooked portions and the portions of the tubing opposite said hooked portions each extending in an uninterrupted plane longitudinally of the seam with certain of the inter-engaging pairs of surfaces of said hooked portions and co-operating opposite portions within the joint minutely knurled with non-registering serrations extending transversely of the joint whereby longitudinal slippage of said edges relative to each other is prevented.

6. Lock-joint metal tubing comprising a main tubular member having its edges provided with reversely disposed, turned-back hooked portions, inter-engaging each other and pressed together and to the co-operating portions at each edge opposite the hook portions, said hooked portions and the portions of the tubing opposite said hooked portions each extending in an uninterrupted plane longitudinally of the seam with certain of the inter-engaging pairs of surfaces of said hooked portions and co-operating opposite portions within the joint roughened by minute non-registering knurlings extending transversely of the joint.

7. As a new article of manufacture lock-joint metal tubing having at the joint two inter-engaged hooked portions, the mass of each of said hooked portions and of each adjacent portion of each edge opposite thereto being in an uninterrupted plane longitudinally of the seam with certain of the inter-engaging surfaces of said hooked and co-operating parts within the joint minutely knurled.

8. Lock-joint metal tubing consisting of a main tubular member having its edges provided with reversely disposed, turned-back hooked portions, inter-engaging each other and pressed together and to the co-operating portions at each edge opposite the hook portions, said hooked portions and the portions of the tubing opposite said hooked portions each extending in an uninterrupted plane longitudinally of the seam with certain of the surfaces of said hooked portions within the joint minutely knurled with serrations extending transversely of the joint whereby longitudinal slippage of said edges relative to each other is prevented.

In witness whereof I have affixed my signature, this 22nd day of November, 1926.

FRANK W. SCHNEIBLE.